(12) United States Patent
Black et al.

(10) Patent No.: US 8,688,826 B2
(45) Date of Patent: Apr. 1, 2014

(54) MOBILE COMPUTING DEVICE AND METHOD WITH INTELLIGENT PUSHING MANAGEMENT

(75) Inventors: Gregory R. Black, Vernon Hills, IL (US); Robert L. Albrecht, Rolling Meadows, IL (US); Venkateswaran Ayalur, Lindenhurst, IL (US); Prashanth Alva, Gurnee, IL (US); Ashok Periasamy, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 423 days.

(21) Appl. No.: 12/908,111

(22) Filed: Oct. 20, 2010

(65) Prior Publication Data

US 2011/0131321 A1    Jun. 2, 2011

Related U.S. Application Data

(60) Provisional application No. 61/265,211, filed on Nov. 30, 2009.

(51) Int. Cl.
*G06F 15/173* (2006.01)

(52) U.S. Cl.
USPC ............................ 709/224; 709/223; 709/225

(58) Field of Classification Search
USPC ................................................ 709/223–225
See application file for complete search history.

(56) References Cited

U.S. PATENT DOCUMENTS

| | | |
|---|---|---|
| 5,719,706 A | 2/1998 | Mansumoto et al. |
| 5,930,050 A | 7/1999 | Dewald |
| 6,239,729 B1 | 5/2001 | Takeuchi |
| 6,343,862 B1 | 2/2002 | Sawai et al. |
| 7,016,710 B2 | 3/2006 | Carmeli et al. |
| 7,054,399 B1 | 5/2006 | Hildebran et al. |
| 7,136,680 B2 | 11/2006 | Leizerovich et al. |
| 7,203,131 B2 | 4/2007 | Watt |

(Continued)

FOREIGN PATENT DOCUMENTS

| | | |
|---|---|---|
| EP | 0833537 B1 | 7/2002 |
| EP | 1981224 B1 | 7/2011 |

(Continued)

OTHER PUBLICATIONS

3GPP; 3rd Generation Partnership Project: Technical Specification Group GSM/EDGE Radio Access Network; Mobile Radio Interface Layer 3 Specification, Radio Resource Control Protocol (Release 1999); TS 04.18 V8.13.0 (Feb. 2002); 50 Pages.

(Continued)

*Primary Examiner* — Mohamed Wasel
(74) *Attorney, Agent, or Firm* — Gary J. Cunningham

(57) ABSTRACT

A method (700) and mobile computing device (200) are described. In its simplest form, the method includes the steps of: operating (710) an application in synchronous communication with an application server via a persistent IP session, defining an active mode, wherein the synchronous communication is automatically enabled by establishing a persistent IP session according to a prearranged schedule; and providing (720) a dormant mode wherein the synchronous communication is automatically disabled in the mobile device by closing the persistent IP session according to the prearranged schedule. Advantageously, energy can be saved in the mobile computing device, thereby extending the life of an energy storage device or a battery. By the use of intelligent pushing management, substantial energy savings can be gained, by using prearranged scheduling of dormant and active modes.

19 Claims, 6 Drawing Sheets

(56) References Cited

U.S. PATENT DOCUMENTS

| | | |
|---|---|---|
| 7,216,053 B2 | 5/2007 | Rakkola et al. |
| 7,254,605 B1 | 8/2007 | Strum |
| 7,323,970 B1 | 1/2008 | Murray et al. |
| 7,387,389 B2 | 6/2008 | Gupta et al. |
| 7,505,795 B1 | 3/2009 | Lim et al. |
| 7,539,160 B2 | 5/2009 | Virtanen et al. |
| 7,554,441 B2 | 6/2009 | Viegers et al. |
| 7,868,778 B2 | 1/2011 | Kenwright |
| 7,984,161 B2 | 7/2011 | Esteve Balducci et al. |
| 8,121,585 B2 | 2/2012 | Commarford et al. |
| 8,135,392 B2 * | 3/2012 | Marcellino et al. ........... 455/418 |
| 8,155,625 B2 | 4/2012 | Morgan |
| 2002/0046299 A1 | 4/2002 | Lefeber et al. |
| 2002/0090932 A1 | 7/2002 | Bhatia et al. |
| 2003/0038928 A1 | 2/2003 | Alden |
| 2003/0103026 A1 | 6/2003 | Yamakawa et al. |
| 2003/0191976 A1 | 10/2003 | Cyran et al. |
| 2003/0217181 A1 | 11/2003 | Kiiskinen |
| 2004/0025067 A1 | 2/2004 | Gary et al. |
| 2004/0179537 A1 | 9/2004 | Boyd et al. |
| 2004/0225906 A1 | 11/2004 | Watts et al. |
| 2004/0243617 A1 | 12/2004 | Bayyapu |
| 2005/0076256 A1 | 4/2005 | Fleck et al. |
| 2005/0120255 A1 * | 6/2005 | Padawer et al. ............... 713/320 |
| 2006/0017629 A1 | 1/2006 | Ko et al. |
| 2006/0020707 A1 | 1/2006 | Undery et al. |
| 2006/0088003 A1 | 4/2006 | Harris |
| 2006/0174028 A1 | 8/2006 | Zhu |
| 2006/0194549 A1 | 8/2006 | Janik et al. |
| 2006/0223504 A1 | 10/2006 | Ishak et al. |
| 2006/0223593 A1 | 10/2006 | Ishak |
| 2006/0230450 A1 | 10/2006 | Bu et al. |
| 2006/0276173 A1 | 12/2006 | Srey et al. |
| 2007/0057068 A1 | 3/2007 | Tsai |
| 2007/0075127 A1 | 4/2007 | Rosenberg |
| 2007/0135080 A1 | 6/2007 | Islam et al. |
| 2007/0238440 A1 | 10/2007 | Sengupta et al. |
| 2007/0241888 A1 | 10/2007 | Mantovani et al. |
| 2007/0270140 A1 | 11/2007 | Islam et al. |
| 2007/0270150 A1 | 11/2007 | Yutkowitz |
| 2008/0004063 A1 | 1/2008 | Haapoja et al. |
| 2008/0020808 A1 | 1/2008 | Wang et al. |
| 2008/0049714 A1 | 2/2008 | Commarford et al. |
| 2008/0141261 A1 | 6/2008 | Machida |
| 2008/0165714 A1 | 7/2008 | Dettinger et al. |
| 2008/0228428 A1 | 9/2008 | Balss et al. |
| 2008/0228429 A1 | 9/2008 | Huang et al. |
| 2008/0239170 A1 | 10/2008 | Klosowiak et al. |
| 2008/0242370 A1 * | 10/2008 | Lando et al. .................. 455/574 |
| 2009/0061925 A1 | 3/2009 | Finkelstein et al. |
| 2009/0164810 A1 | 6/2009 | Kyro et al. |
| 2009/0209291 A1 | 8/2009 | Ramprasad et al. |
| 2009/0221277 A1 | 9/2009 | Fomin et al. |
| 2009/0305732 A1 * | 12/2009 | Marcellino et al. ........... 455/466 |
| 2010/0048256 A1 | 2/2010 | Huppi et al. |
| 2010/0050180 A1 | 2/2010 | Amsterdam et al. |
| 2010/0115048 A1 | 5/2010 | Scahill |
| 2010/0250986 A1 | 9/2010 | Black et al. |
| 2010/0274507 A1 | 10/2010 | Black et al. |
| 2011/0122818 A1 | 5/2011 | Dwyer et al. |
| 2011/0182220 A1 | 7/2011 | Black et al. |

FOREIGN PATENT DOCUMENTS

| | | |
|---|---|---|
| JP | 3278682 A | 12/1991 |
| JP | 6186524 A | 7/1994 |
| JP | 2005159429 A | 6/2005 |
| KR | 10-2006-0048616 A | 5/2006 |

OTHER PUBLICATIONS

3GPP; 3rd Generation Partnership Project; Technical Specification Group Radio Access Network; Radio Resource Control (RRC) Protocol Specification (Relese 1999); TS 25.331 V3.21.0 (Dec. 2004); 26 Pages.

Patent Cooperation Treaty, International Search Report and Written Opinion of the International Searching Authority for International Application No. PCT/US2010/057159, Mar. 28, 2011, 14 pages.

Korean Intellectual Property Office, "Notice of Preliminary Rejection" for Patent Application No. 10-2012-7013979 dated Aug. 26, 2013, 4 pages.

* cited by examiner

MOBILE COMPUTING DEVICE AND METHOD WITH INTELLIGENT PUSHING MANAGEMENT

FIELD OF THE INVENTION

The field of the invention relates to mobile computing devices in communication with application servers, and methods with intelligent pushing management, to reduce energy drain.

BACKGROUND OF THE INVENTION

Mobile computing devices, such as mobile or wireless stations, cellphones, radios, laptops, wireless communication devices and the like, operate with a power storage device with a limited energy supply, such as a battery, fuel cell or the like. A mobile computing device needs a power source and, in many cases, this power source is a battery. For instance, cellular phones use various types of batteries to operate. The amount of time a mobile station can typically operate before the energy of the battery is consumed (which is often referred to as "battery life"), is often an important criteria that consumers use in choosing one brand or type of mobile computing device over another brand. The terms battery, energy storage device and power storage device are used interchangeably herein.

While the power storage device is generally rechargeable, it may not be convenient or even possible for a user to recharge. Accordingly, there is a need to maximize the useful operational time of a wireless computing device.

Additionally, different operating environments can cause the user to be surprised and/or frustrated when the battery runs out much more quickly than would typically be expected by the user. Thus, a variation or unexpected short battery life is very undesirable from a user perspective.

This is a particularly relevant problem for mobile computing devices running applications supported by an applications server because of the power drain due to the wireless data exchange between the mobile device and the server, since each upload or download causes the consumption of energy in the mobile device and server. The problem is especially acute in the mobile device, which is typically battery powered and has finite energy available. For example, a mobile device may employ an email server for uploading and downloading email in support of an email application, a contact server for uploading and downloading contact status in support of a social networking application, an information server for downloading movies, news, music, etc. in support of a media playing application, and a back-up/storage server for uploading mobile device data in support of a data back-up application. Typically, the mobile device and application server synchronize on a regular or periodic basis, i.e. they communicate, upload, download or exchange information at essentially regular or fixed time intervals, and in this document, the exchange of data between and mobile device running an application and an application server is referred to as "synchronization", and the amount of time between data exchanges is referred to as the "synchronization interval" or "sync interval", for a given application and application server. Thus, there is a need for increasing a length of a synchronization interval, in order to conserve energy in a power storage device of a wireless computing device, such as a mobile station, in order to prolong useful power storage device or battery life.

Generally, there is a tradeoff between good application performance which requires more frequent data exchanges, i.e. a short synchronization interval, and good battery life which requires less frequent data exchanges, i.e. a long synchronization interval. For example, performance of an email application may be determined by the amount of time it takes to receive an email, and performance of a social networking application may be determined by the delay in receiving a change in a social contact's status.

The exchange of data with an application server may be initiated by the server, i.e. a "push" data service, or by the mobile, i.e. a "pull" data service. In the case of a "pull" data service the mobile device typically provides a timer operable to trigger the expiration of the synchronization interval at which time the mobile device may pole the application for the availability of new application data. Thus with a "pull" data service the mobile device is in control of the synchronization interval, also known as the pulling or poling interval. Conversely, in the case of a "push" data service the mobile device responds to the synchronization requests from the server which may or may not be periodic.

It is known to vary the synchronization interval according to the application, since the performance of certain applications may be more sensitive to synchronization frequency than others. It is also known that the requirement for timely synchronization varies with the state of the application. Synchronization may also be initiated a-periodically by the application running on the mobile device, or by the user. Thus, when multiple applications are running, each application is likely to require different synchronization intervals, which may or may not be controlled by the mobile device.

Synchronization of an application with an application server involves the uploading or downloading of application data between the mobile device and the application server over the communication infrastructure. Before the application data is exchanged with the application server there is a need to execute certain starting activities, such as powering-up the communication circuits, and establishment of a data communications session with the communication infrastructure. Similarly after the data is exchanged with the application server there is a need to execute certain ending activities, such as terminating the data communication session with the communication infrastructure and powering-down the data communication circuits. These starting and ending activities cause power drain in the mobile device. Thus there is a tendency for uncoordinated synchronization which causes power drain due to the stopping and starting activities associated with each data exchange. Thus, there is a need to minimize the starting and stopping activities by coordinating the synchronization times for multiple applications.

When operating a mobile device in synchronous communication with an application server, there is a tradeoff between good application performance which requires more frequent data exchanges, i.e. a short synchronization interval, and good battery life which requires less frequent data exchanges, i.e. a long synchronization interval It is known to vary the synchronization interval according to a schedule, such that the period between downloading increases when certain applications are less likely to require frequent downloads. However, since application usage is a human behavior, the optimum download period cannot always be predicted and scheduled. Furthermore, the power drain due to the wireless data exchange with the application server may be unpredictable. The available wireless networks may be such that only data transmission methods requiring high power consumption are available. Hence, the optimum synchronization interval cannot always be predicted and scheduled. Thus, there is a need to provide a longer downloading synchronization interval or period for drawing less energy consumption at certain "dormant times", while also providing shorter downloading synchronization intervals at "active times", when an application requires timely information.

Also, there is a need to provide a longer downloading synchronization interval or period for drawing less energy consumption when the energy required for synchronization is higher, while also providing shorter downloading synchronization interval when the energy required for synchronization is lower, thereby taking advantage of favorable network conditions which may be temporary.

In connection with push applications, data is pushed on a regular interval from an application server, and Applicant is not aware of a method available at any mobile client for adjusting the pushing interval. It would be considered an improvement in the art, if a mobile device could autonomously adjust the rate at which it accepts pushed data. In addition, it would also be considered an improvement in the art if a mobile device could control applications in which data is pushed from an application server to the mobile device.

Figure 1:
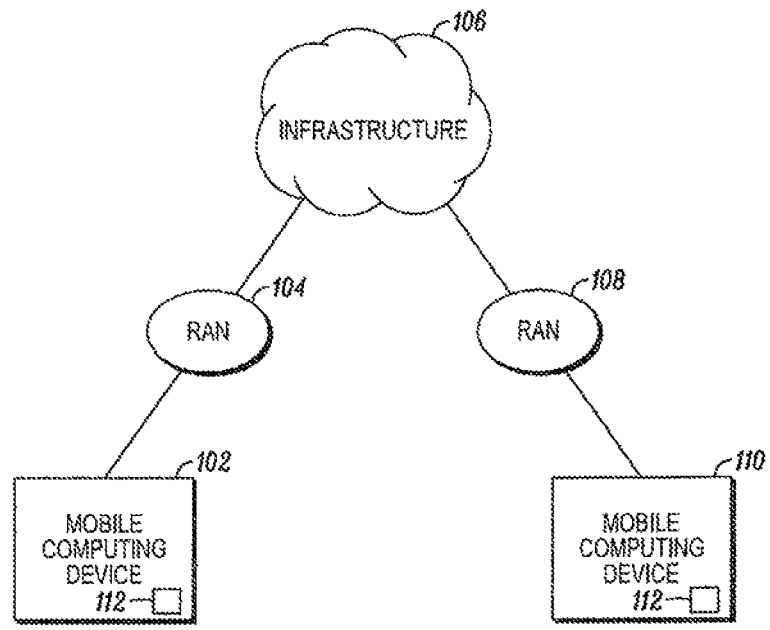
FIG. 1 is a block diagram of a system with enhanced poling management to reduce energy drain, according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve the understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method is described that controls the length of the synchronization interval associated with a mobile computing device (or mobile station, wireless communication device, wireless computing device, mobile or wireless station, cellphone, radio, laptop and the like, such terms used interchangeably herein) running an application in periodic or synchronous communication with an application server, in order to conserve and improve the life of an energy storage device in connection with a mobile computing device. The approaches described herein allow a mobile computing device to operate in a variety of conditions and provide a variety of bandwidth intensive services without substantially compromising the energy storage device in association with the mobile station.

Coordinating the synchronization interval of the periodic or synchronous communication between the mobile computing device running multiple applications with respective application servers may be made in a variety of different ways. In one example, the mobile device is equipped with a poling manager, which: receives for each application an ideal poling interval and tolerance window; monitors communication activity of the mobile computing device; determines the time elapsed since the previous synchronization for each application; and synchronizes the application if the time elapsed since the previous synchronization is substantially equal to the ideal poling interval for the application, or communication activity is detected and the time elapsed since the previous synchronization is within the tolerance window for the application.

In another example, the poling manager: receives for each application an ideal poling interval and tolerance window; monitors communication activity of the mobile computing device; determines the time elapsed since the previous synchronization for each application; selects a preferred synchronization interval between the time elapsed since the previous synchronization and a future synchronization interval, and synchronizes the application if the time elapsed since the previous synchronization is substantially equal to the ideal poling interval for the application, or communication activity is detected, the time elapsed since the previous synchronization is within the tolerance window for the application and is the preferred synchronization interval.

The length of the synchronization interval may be dynamically decreased or increased from the ideal interval, depending on the monitored communication activity and the determined preference.

Further adjustments may also be made. For instance, the window of tolerance for a first application may be adjusted depending on the ideal synchronization interval of a second application, as detailed below.

Thus, approaches are described whereby the power storage device of the mobile computing device is improved even under less than ideal operating conditions and different modes of operation, such as multiple applications running in synchronous communication with an application server. Consequently, the mobile computing device can operate under a variety of operating conditions Referring to FIG. 1, one example of a system with enhanced poling management for increasing the battery life of a mobile computing device, is described. The system includes a first mobile computing device 102 that is coupled to a first Radio Access Network (RAN) 104. The first RAN 104 is coupled to a communication infrastructure 106. The infrastructure can include a plurality of application servers, for running various applications, as detailed below. A second mobile computing device 110 is coupled to a second RAN 108. The second RAN 108 is also coupled to the infrastructure 106. The principles described herein may be applied to a variety of wide area network systems, such as long-term evolution (LTE), ultra mobile wideband (UMB), 802.16e & m, High Rate Packet Data (HRPD) systems, or systems such as the Universal Mobile Telecommunication System (UMTS), as well as wireless local area networks, personal area networks, and wired networks.

The mobile computing devices 102 and 110 may be any type of mobile wireless device. The mobile computing devices 102 and 110 each include a poling management module 112 for coordinating synchronous communications between application server poling applications, as detailed below. For example, the mobile computing devices 102 and 110 may be cellular telephones, pagers, radios, mobile stations, personal computers, or personal digital assistants. As should be understood by those skilled in the art, other examples of mobile computing devices are possible.

The RANs 104 and 108 may be any device or combination of devices that allow the mobile computing devices 102 and 110 to have access to the communication infrastructure 106. For example, the RANs 104 and 108 may include access points, base stations, base station controllers, antennas, and other types of devices that facilitate these communications.

The communication infrastructure 106 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile computing devices 102 and 110.

Figure 2:
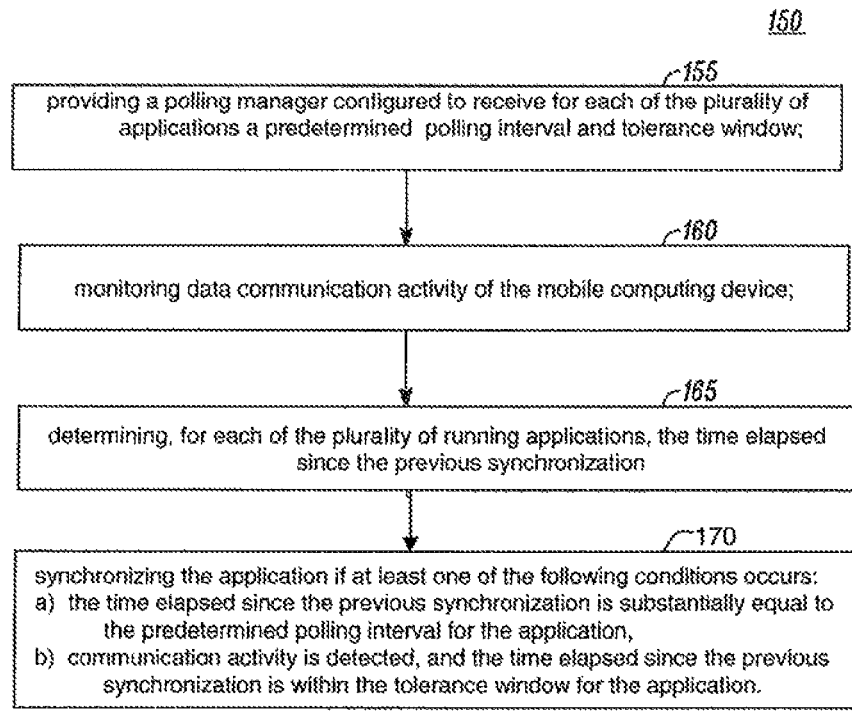
FIG. 2 is a flowchart of one example of an approach for enhancing poling management to reduce energy drain, according to the present invention.

Referring now to FIG. 2, an exemplary method of enhancing poling management for extending the useful life of an energy storage device in a mobile computing device, is shown. The method 150 is configured to help lengthen the battery life of a mobile computing device running a plurality of applications in synchronous or asynchronous, data communication with an application server. The method 150 includes the steps of: providing 155 a poling manager configured to receive for each of the plurality of applications a predetermined poling interval and tolerance window; monitoring 160 data communication activity of the mobile computing device; determining 165, for each of the plurality of running applications, the time elapsed since the previous synchronization; and synchronizing 170 the application if at least one of the following conditions occurs: the time elapsed since the previous synchronization is substantially equal to the predetermined poling interval for the application; and communication activity is detected, and the time elapsed since the previous synchronization is within the tolerance window for the application. Advantageously, this method can provide substantial energy savings in an energy storage device in mobile computing device applications, for example, by synchronizing and running multiple applications together, which saves energy storage device or battery life by turning on the transceiver circuitry when necessary and minimizing or eliminating unnecessary or redundant synchronization, by the use of dynamic and smart poling management techniques, as detailed herein. This can be accomplished by providing a poling interval for each application that is within its window of tolerance, for example.

Figure 3:
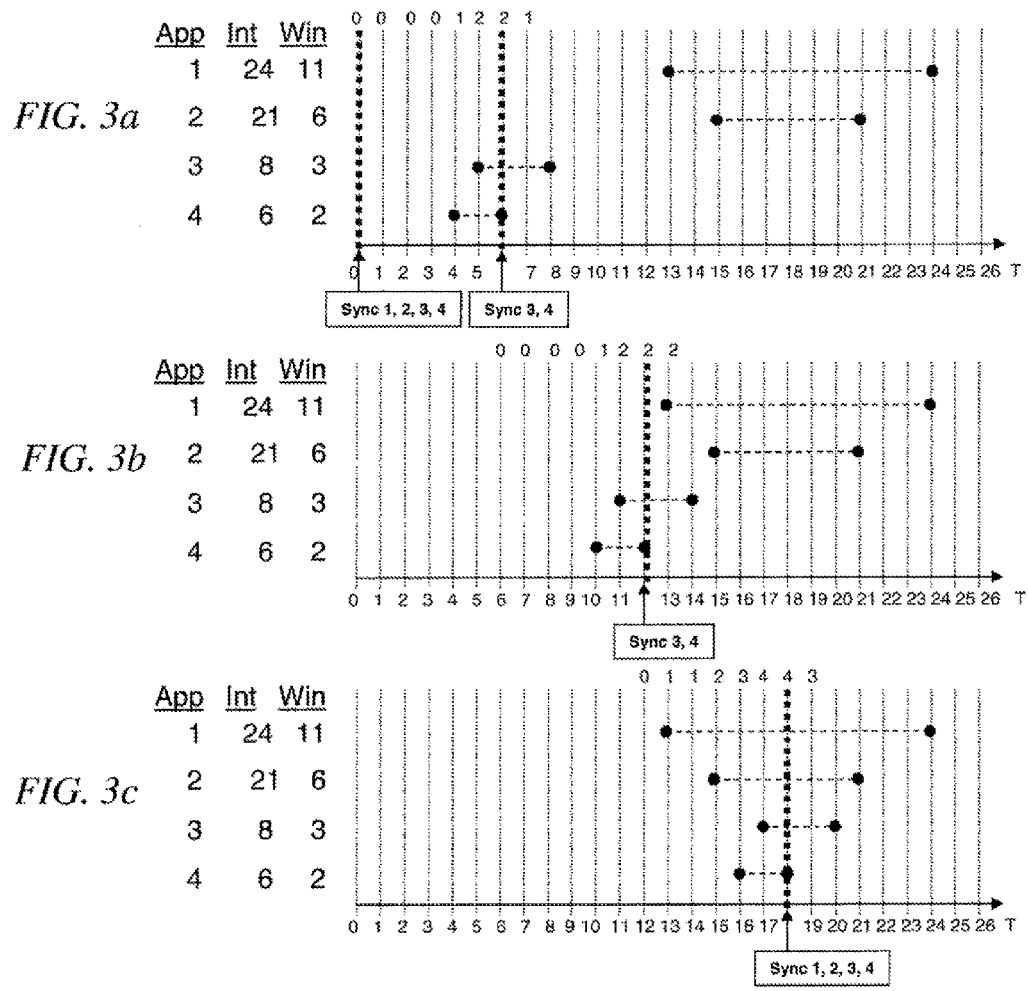
FIG. 3 is a series of timing diagrams depicting the poling operation of a mobile computing device according to a first embodiment of the present invention.

In one arrangement, the synchronizing step 170 is triggered by detecting synchronization activity initiated by at least one of: an application; an application server; and a user. This provides each application the opportunity to synchronize with its respective application server in coordination with the detected communication activity. In further detail, the synchronizing step 170 can be triggered substantially immediately after completion of the detected synchronization activity, thus avoiding stopping and restarting of the communication circuits, and thereby saving energy. Referring to FIG. 3, four synchronizations are shown moving from the top to the bottom of the figure, at time zero, six, twelve and eighteen, respectively. Application 1 has a synchronization interval of 24 units and window of tolerance of 11 units. The units can be in milliseconds. Application 2 has a synchronization interval of 21 units and window of tolerance of 6 units. Application 3 has a synchronization interval of 8 units and window of tolerance of 3 units. Application 4 has a synchronization interval of 6 units and window of tolerance of 2 units. Referring to FIG. 3*a*, at time 0, a sync occurs for applications 1, 2, 3, and 4. At time 6, a synch occurs, triggered by the amount of time passing since the previous synchronization being equal to the synchronization interval for application 4. Applications 3 and 4 are synchronized because these are the applications for which the window of tolerance includes time 6. Referring now to FIG. 3*b*, the window of tolerance is shifted from FIG. 3*a* for applications 3 and 4, to account for the time of the previous synchronization having changed from time 0 to time 6. At time 12, a synch occurs, triggered by the amount of time passing since the previous synchronization being equal to the synchronization interval for application 4. Applications 3 and 4 are again synchronized because these are the applications for which the window of tolerance includes time 12. Referring now to FIG. 3*c*, the window of tolerance is shifted from FIG. 3*b* for applications 3 and 4, to account for the time of the previous synchronization having changed from time 6 to time 12. At time 18, a sync occurs, whereby applications 1, 2, 3 and 4 are synchronized because these are the applications for which the window of tolerance includes time 18. Thus it is the synchronization of the four applications is coordinated thereby reducing power drain in the data communication device.

By the use of smart poling management techniques, as detailed herein, synchronizing and running multiple applications together, can provide substantial energy savings. For example, the transceiver circuitry is turned on at times 0, 6, 12 and 18, as necessary to obtain a down load, etc. Referring again to FIG. 3*a*, unnecessary or redundant synchronizations do not occur, as would happen at time 8, for example, if the synchronization for application 3 were not advanced from time 8 to time 6.

In one embodiment, the method 150 can further include advancing the predetermined poling interval of a second application within the window of tolerance, to synchronize substantially immediately after a first application, as shown at times 6, 12 and 18 in FIG. 3, for example. This is beneficial as this can provide coordinated synchronization activity within the window of tolerance for both applications.

In another embodiment, the synchronizing step 170 can be advanced or adjusted from its predetermined or ideal poling interval in the event that synchronization activity is detected within the tolerance window. This allows an application to synchronize immediately after communication operations which are not necessarily for application server poling operations, such as a synchronization initiated by the application server, i.e. a "push" synchronization, or other asynchronous communications such as that which is triggered by a high priority application event or by the user.

In one embodiment, the predetermined poling interval is a maximum poling interval. In one embodiment, the method 150 can include increasing the predetermined poling interval when a connection to a certain application server or network is unavailable, thereby avoiding unsuccessful or unnecessary, poling attempts which saves energy.

In another embodiment, the method 150 includes adjusting the predetermined poling interval outside of the window of tolerance based on a network condition, thereby reducing unnecessary synchronizations when the communication is especially costly from the standpoint of energy expenditure.

In more detail, in one embodiment, the network condition can include at least one of transmit power level, received signal level, received signal quality, modulation type, coding level, and communication data rate. These conditions can affect the power drain associated with each communication. For example, if the network requires a higher mobile device power level, it may be preferable to delay the synchronization outside of the window of tolerance.

In another embodiment, the method 150 can include adjusting the predetermined poling interval outside of the window of tolerance when a certain communication mode is available. For example, in a cellular network providing $3^{rd}$ generation service e.g. wideband CDMA, as well as $2^{nd}$ generation service e.g. TDMA, the poling interval may be adjusted outside of the window of tolerance if one of the services is unavailable. For example, if the application typically uploads or downloads large files, and the wider bandwidth 3G service is unavailable, the synchronization may be postponed. This feature provides the flexibility to change the synchronization interval depending on the anticipated power drain which is a function of service availability and operating conditions.

In another embodiment, the communication mode can be at least one of a wired network communication mode, a wireless local area network communication mode, a wireless mesh network communication mode, and an optical network communication mode. Thus synchronization can be advanced, inside or outside the window of tolerance, if the communication mode is particularly energy-efficient, such as a wired local area network (LAN) communication mode, or a wireless LAN.

Advantageously, these features allow the mobile computing device to upload application data in coordination with other communication for other applications. For example, a first application could be a social network application such as face-book or twitter, and a second could be a data back-up application. The social network applications, which include real-time communication of personal messages, status and other personal data, is the higher priority application requiring periodic or synchronous server communications with a period or a synchronization interval on the order of 10 minutes. The data back-up application is the lower priority application requiring a synchronization interval on the order of 12 hours. Typically the window of tolerance for the data back-up application is much larger than 10 minutes, the ideal poling interval for the social networking application. Thus the data back-up synchronization occurs immediately after the social networking application synchronization, after the window of tolerance is opened for the data back-up application, for example. This is an opportune time from the standpoint of power drain, as the unnecessary stopping and starting of the communication circuits is avoided.

Refer again in more detail to FIG. 3, where there is shown a first series of timing diagrams corresponding to an exemplary device running four applications in synchronous communication with an application server. Each timing diagram depicts increasing time on the horizontal axis with a grid interval from 1 to 26. So, for a grid interval of 30 minutes the 26 intervals on the horizontal axis represent 13 hours of operation. For each application there is a corresponding predetermined synchronization interval and a predetermined synchronization interval window of tolerance. The first application has a predetermined synchronization interval of 24 grid intervals (e.g. 12 hours) and a window of tolerance of 11. The second application has a predetermined interval of 21 grid intervals (e.g. 10.5 hours) and a window of tolerance of 6. The third application has a predetermined interval of 8 grid intervals (e.g. 4 hours) and a window of tolerance of 3. And, the fourth application has a predetermined interval of 6 grid intervals (e.g. 3 hours) and a window of tolerance of 2. For each application the window of tolerance is defined having a maximum time determined by the previous synchronization time plus the predetermined interval, and a minimum time determined by the maximum time minus the window of tolerance. Referring now to timing diagram 3a, start-up occurs with synchronization of the four applications at grid time T=0. Thus, after synchronization at T=0, the first application has a maximum time of 24 and minimum time of 13, the second application has a maximum time of 21 and a minimum time of 15, the third application has a maximum time of 8 and minimum time of 5, and the fourth application has a maximum time of 6 and a minimum time of 4. At grid interval=6 (e.g. 3 hours), the time reaches the predetermined interval for the fourth application, which triggers data synchronization. At this time each application is checked to determine if the time is between the minimum and maximum time, or in other words whether the window of tolerance is open. In this example, it is determined that the window of tolerance is open for applications 3 and 4, and therefore applications 3 and 4 are synchronized with their respective application servers at time T=6. Referring now to diagram 3b, the windows of tolerance have been redrawn for applications 3 and 4, taking into account the previous synchronization at time T=6. At grid interval=12 (e.g. 6 hours), the time reaches the predetermined interval for the fourth application, which triggers data synchronization, and each application is checked to determine if the window of tolerance is open. It is determined that the window of tolerance is open for applications 3 and 4, and therefore applications 3 and 4 are synchronized with their respective application servers at time T=12. Referring now to diagram 3c, the windows of tolerance have been redrawn for applications 3 and 4, taking into account the previous synchronization at time T=12. At grid interval=18 (e.g. 9 hours), the time reaches the predetermined interval for the fourth application, which triggers data synchronization, and each application is checked to determine if the window of tolerance is open. It is determined that the window of tolerance is open for applications 1, 2, 3, and 4, and therefore applications 1, 2, 3 and 4 are synchronized with their respective application servers at time T=18. Thus the synchronization times of four applications are grouped together such that the number of synchronization occurrences is minimized to 3 times in 18 grid intervals, whereas in the uncoordinated cases the number of synchronization occurrences could be as many as 9.

In another arrangement, the method 150 can include reducing the window of tolerance of a first application when the predetermined poling interval for a second application, is below a threshold. In the above first example, the data back-up application may have a window of tolerance on the order of 2 hours. The synchronization for the data back-up application is triggered by the communication activity of the social networking application, which occurs every 10 minutes. Therefore the synchronization of the data back-up application occurs within the first 10 minutes of the opening of its window of tolerance, thereby reducing the synchronization interval for the data back-up application by an amount nearly equal to the window of tolerance. In situations such as this, it is advantageous to reduce the window of tolerance for the lower priority application to an amount on the order of ideal synchronization interval of the highest priority applications.

In more detail, the reducing step can comprise providing a tolerance window for the second application, reduced from a predetermined tolerance window, when a predetermined poling interval received from the first application, is below a threshold. In the earlier example, the window of tolerance of the data back-up application may be reduced from 2 hours to 10 or 20 minutes, which is one or two times the 10 minute ideal interval for the social networking application. In more detail, the threshold can be proportional to the tolerance window received from the second application. For example, the threshold may be a fraction, such as ¾, of the predetermined tolerance window of the second application. Thus if the poling manager receives a tolerance window of two hours from the second application, and the ideal synchronization interval is less than ¾*2 hours, or 1.5 hours, then the window of tolerance for the second application can be reduced to one to two times the ideal interval for the first application, or 10 to 20 minutes.

Figure 4:
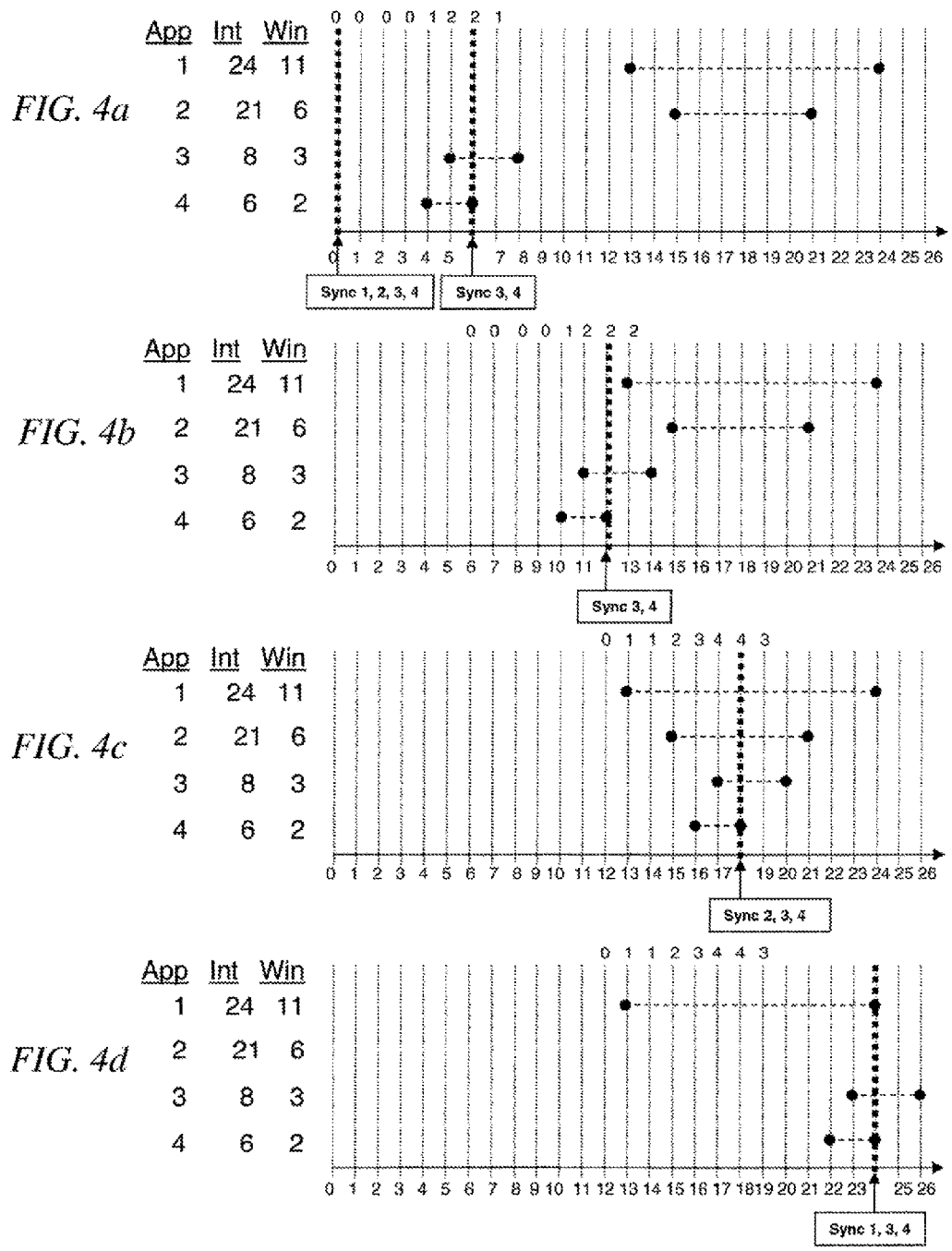
FIG. 4 is a series of timing diagram depicting the poling operation of a mobile computing device according to a second embodiment of the present invention.

In an alternative embodiment, the method 150 for lengthening the battery life of a mobile computing device running a plurality of applications in synchronous data communication with an application server, comprises the steps of: providing a pulling manager having, for each application, a predetermined pulling interval and tolerance window; monitoring data communication activity of the mobile computing device; determining, for each applications, the time elapsed since the previous synchronization; selecting a preferred synchronization interval, from among at least the time elapsed since the previous synchronization and a future synchronization interval; and synchronizing the application if at least one of the following conditions occurs: a) the time elapsed since the previous synchronization is substantially equal to the predetermined poling interval for the application; and b) communication activity is detected, the time elapsed since the previous synchronization is within the tolerance window for the application and is the preferred synchronization interval. Thus, for a lower priority application having a longer predetermined or ideal interval, synchronization may occur immediately after data communication for a higher priority application, or it may be postponed to a later time within the window of tolerance, thereby selecting a synchronization interval which is closer to the predetermined, or ideal, synchronization interval. The preferred synchronization interval may be the time which is closer to the predetermined pulling interval It is noteworthy that in this embodiment the window of tolerance may be a two sided window, whereby a selected synchronization interval for the lower priority application may be less than or larger than the predetermined synchronization interval. In this case the predetermined interval may be an ideal interval, and synchronization may occur either before, or after the predetermined interval. Alternatively, the window of tolerance may be one sided and the predetermined interval is a maximum interval, in which case the synchronization interval is always advanced from the predetermined interval. Alternatively, the window of tolerance may be one sided and the synchronization interval is a minimum interval, in which case the synchronization is always delayed from the predetermined interval. For an alternate embodiment of the second example, refer to FIG. 4, where there is shown a first series of timing diagrams corresponding to an exemplary device running four applications in synchronous communication with an application server. Each of the applications has the same predetermined interval and window of tolerance as detailed in FIG. 3, and the maximum and minimum synchronization times are similarly calculated.

Referring to timing diagram 4a, start-up occurs with synchronization of the four applications at grid time T=0. At grid interval=6 (e.g. 3 hours) the time reaches the predetermined interval for the fourth application, which triggers data synchronization. At this time, each application is checked to determine if the window of tolerance is open. Unlike in the example of FIG. 3, if the window is open, a preferred synchronization time is chosen from between the present time or the next anticipated synchronization, which is the present time plus the minimum predetermined interval. In this example, it is determined that the window of tolerance is open for applications 3 and 4, and for both applications, the present time (T=6) is preferred over the anticipated next synchronization time (T=12) because the present time is closer to the predetermined time. Therefore applications 3 and 4 are synchronized with their respective application servers at time T=6. Referring to diagram 4b, the windows of tolerance have been redrawn for applications 3 and 4, taking into account the previous synchronization at time T=6. At grid interval=12 (e.g. 6 hours) the time reaches the predetermined interval for the fourth application, which triggers data synchronization, and each application is checked to determine if the window of tolerance is open. In this example, it is determined that the window of tolerance is open for applications 3 and 4, and for both applications, the present time (T=12) is preferred over the anticipated next synchronization time (T=18) because the present time is closer to the predetermined time. Therefore, applications 3 and 4 are synchronized with their respective application servers at time T=12.

Referring now to diagram 4c, the windows of tolerance has been redrawn for applications 3 and 4, taking into account the previous synchronization at time T=12. At grid interval=18 (e.g. 9 hours), the time reaches the predetermined interval for the fourth application, which triggers data synchronization, and each application is checked to determine if the window of tolerance is open. It is determined that the window of tolerance is open for applications 1, 2, 3, and 4, and for applications 2, 3 and 4, the present time (T=18) is preferred over the anticipated next synchronization time (T=24) because the present time is closer to the predetermined time. For application 1 the present time (T=18) is not preferred because the anticipated next synchronization time (T=24) is closer to the predetermined time. Therefore applications 2, 3 and 4 are synchronized with their respective application servers at time T=18.

Referring now to diagram 4d, at grid interval=24 (e.g. 12 hours) the time reaches the predetermined interval for the fourth application, which triggers data synchronization, and each application is checked to determine if the window of tolerance is open. It is determined that the window of tolerance is open for applications 1, 3, and 4, and for applications 1, 3 and 4, the present time (T=24) is preferred over the anticipated next synchronization time (T=30) because the present time is closer to the predetermined time. Therefore applications 1, 3 and 4 are synchronized with their respective application servers at time T=24. Thus, like in the example of FIG. 3, the synchronization times of four applications are grouped together such that the number of synchronization occurrences is minimized, and in this example for the applications having large tolerance windows and longer predetermined intervals, synchronization occurs closer to the predetermined interval, which reduces the synchronization frequency for that application, and thereby reduces energy drain.

In one embodiment, the synchronization interval comprises an interval for which the number of applications having overlapping tolerance windows is a local maximum. In this way synchronization may be simply determined. This involves counting the number of application for which the time is within the window of tolerance, refraining from triggering synchronization when the count is increasing or steady, and triggering synchronization when the count is reduced, as would happen when the time exceeds a window of tolerance for an application. Referring again to the examples of FIG. 3 and FIG. 4, the number of overlapping windows is shown as a series of numbers above each timing diagram, and synchronization occurs at the grid interval where the series is a maximum.

In more detail, the future synchronization interval can be determined by adding the shortest predetermined poling interval of each of the running applications to time elapsed since the previous application. Thus, in one arrangement, the poling manager can be further configured to receive for each of the plurality of applications an ideal poling interval, and the step of selecting can further comprise selecting the interval which is closer to the ideal poling interval, for the reasons detailed above.

Likewise, in one arrangement, the predetermined poling interval is a maximum poling interval, as detailed above. In alternative embodiment the step of selecting a preferred synchronization interval comprises querying the application as to which synchronization interval is the preferred interval. In this case the application may simply select the interval which is closer to the predetermined or ideal interval, or it may select the preferred interval based on some other criteria. This provides an advantage in that the selection criteria may change depending on the application state or context.

In one embodiment, the optimum synchronization interval comprises an interval for which the number of applications having overlapping tolerance windows is a local maximum.

The term application, as used herein, can include at least one of email, instant messaging, social networking, news feeding, gaming, media uploading (e.g. photo uploading), media downloading (e.g. music downloading), and data back-up, or any other application requiring data synchronization or otherwise having regular communication with an application server.

In another embodiment, the method 150 can include providing a mobile computing device in synchronous application server communication for a first application in a first synchronous communication interval, and in synchronous application server communication for a second, lower priority application on a second nominal synchronous communication interval, equal to the first synchronous communication interval times a nominal integer number, wherein the nominal integer is the integer part of a predetermined interval for the second application divided by the predetermined interval for the first application.

In more detail, the synchronizing step 170 can include synchronous communication including at least one of uploading application data from a mobile computing device to an application server and downloading application data to the mobile computing device from an application server.

Advantageously, the features herein allow the mobile computing device to upload application data to a server, when network conditions or other energy determining factors are favorable. For example, the first application could be a social network application such as face-book or twitter and the second could be a data back-up application. The social network applications, which include real-time communication of personal messages, status and other personal data, is the higher priority application requiring periodic or synchronous server communications with a period or a synchronization interval on the order of 10 minutes. The data back-up application is the lower priority application requiring a synchronization interval on the order of 12 hours. In this example, over the course of 12 hours while the social network application synchronizes on the order of 72 times the network conditions may vary significantly. For example, the wide area network RF power level may vary due to variation in path-loss between the mobile device and the network base-station, or due to network traffic, or due to moving to a network with different capabilities, such as to a different wide area network, or a local area network. Thus the data back-up synchronization can occurs at the more opportune times from the standpoint of power drain, windows of tolerance, communication network conditions and other conditions vary.

Figure 5:
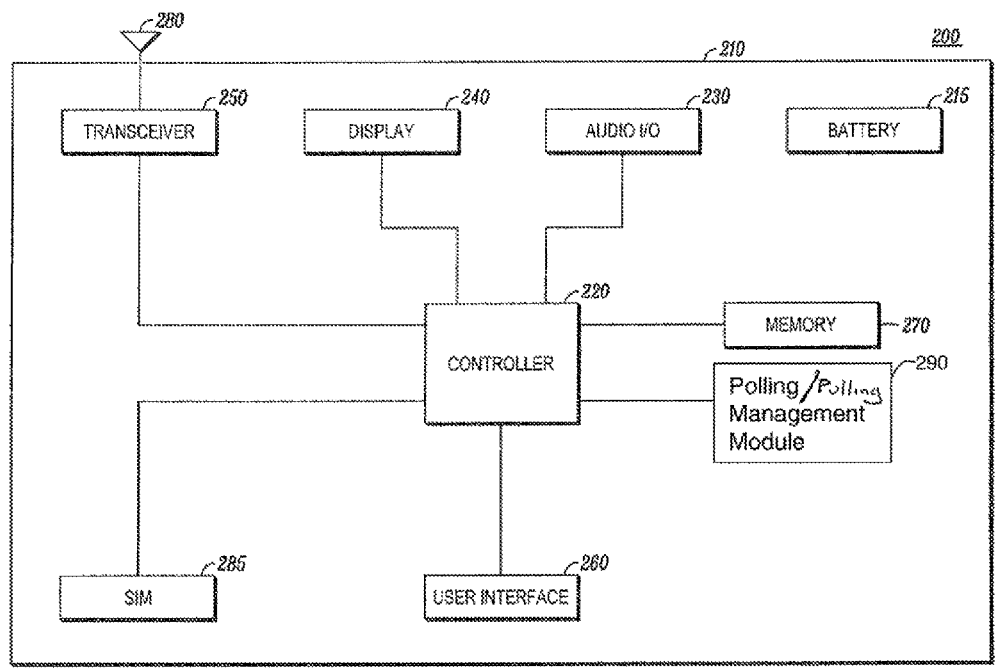
FIG. 5 is a block diagram of a mobile computing device that provides for an improved battery life according to the present invention.

Referring now to FIG. 5, there is shown an exemplary block diagram of a mobile computing device 200, such as the mobile computing devices 102 or 110, according to one embodiment. The mobile computing device 200 can include a housing 210, an energy storage device 215, a controller 220 coupled to the housing 210, audio input and output circuitry 230 coupled to the housing 210, a display 240 coupled to the housing 210, one or more transceivers 250 coupled to the housing 210, a user interface 260 coupled to the housing 210, a memory 270 coupled to the housing 210, an antenna 280 coupled to the housing 210, and a removable subscriber identity module (SIM) 285 coupled to the controller 220. The mobile computing device 200 employs the controller 220 and memory 270 to run applications in synchronous communication with and application server via transceiver 250. The mobile computing device 200 further includes a poling manager 290, coupled to the controller 220. In more detail, the poling manager 290 can reside within the controller 220, can reside within the memory 270, can be an autonomous module, can be an application, can be software, can be hardware, or can be in any other format useful for a module on a wireless communication device 200. In one embodiment, the poling manager 290 can be defined as a controller for coordinating application server communication, based on nominal poling intervals and tolerances for each application.

The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and an electronic device. The memory 270 may include a random access memory, a read only memory, an optical memory or any other memory that can be coupled to a wireless communication device.

In more detail, in one embodiment, the mobile computing device 200 with an energy storage device in FIG. 5, includes: a housing 210; a controller 220 coupled to the housing 210, the controller 220 configured to applications in synchronous communication from one or more application servers; memory 270 coupled to the controller 220; a wireless transceiver 250 coupled to the controller 220 for synchronizing application data between the mobile computing device 200 and the one or more application servers (which could reside in infrastructure 106 in FIG. 1); and an a poling management module 290, the poling management module configured to: receive for each of the plurality of applications a predetermined poling interval and tolerance window; monitor data communication activity of the mobile computing device; determine, for each of the plurality of running applications, the time elapsed since the previous synchronization; and synchronize the application if at least one of the following conditions occurs: the time elapsed since the previous synchronization is substantially equal to the predetermined poling interval for the application, and communication activity is detected, and the time elapsed since the previous synchronization is within the tolerance window for the application. Advantageously, the poling management module 290 can allow the mobile computing device 200 to dynamically manage communication with running applications. This arrangement can provide a longer useful life for mobile computing devices before having to recharge a user's power storage device 215. Beneficially, the poling management module 290 can serve to coordinate communication activity and thereby reduce unnecessary starting and stopping of communication circuits, such as the transceiver 250, thereby extending the useful life of the energy storage device in mobile computing device applications.

In one embodiment, the poling management module 290 includes: a processor configured to pole and synchronize applications; and an adjustment module configured to advance or delay the predetermined poling interval of a second application within the window of tolerance, to synchronize substantially immediately after a first application, for improved power savings.

In one embodiment, the poling management module 290 is further configured to: receive for each of the plurality of applications an ideal poling interval; and select an interval which is closer to the ideal poling interval, for improved power savings.

In one embodiment, the instant invention is incorporated into the communication infrastructure and in another it can be incorporated into a wireless communication device. More specifically, the poling management module 290 may be incorporated into a mobile computing device 200 or alternatively into the infrastructure 106. Other placements are possible, such as including being in both.

In more detail, controller 220 comprises an application processor for running application programs. The application programs may be stand-alone programs or programs running in communication with an application service, in which case the application program is referred to as an application service daemon. Each application running in synchronous communication with an application server may have a corresponding application service daemon running on controller 220. Alternatively the application service daemon may run on any component of the mobile device 200 having application processing capability including display 240 which may comprise an intelligent display controller, transceiver 250, memory 270, SIM 285, or poling management module 290.

In another embodiment, the polling management module 290 provides an autonomous pushing management function, for adjusting the rate at which the mobile device receives data "pushed" from an application server. In a preferred embodiment, the communications from an application service are interrupted during dormancy periods. More specifically module 290 can be further configured to provide a scheduler (not shown) for providing, setting or determining dormancy periods. Synchronous communications which are normally "pushed" by the application server to the mobile device may be suspended during the scheduled dormancy periods, thereby reducing power drain by idling the transceiver 250 during these periods. Power drain may be reduced further by idling the application service daemon during these periods. Consequently, the mobile computing device can utilize a variety of power-consuming applications and services with different synchronization requirements, while maintaining and improving the lifetime of an energy storage device of a mobile computing device. Because of the method, structure and disclosed approaches detailed herein, the user experience can be significantly enhanced.

Figure 6:
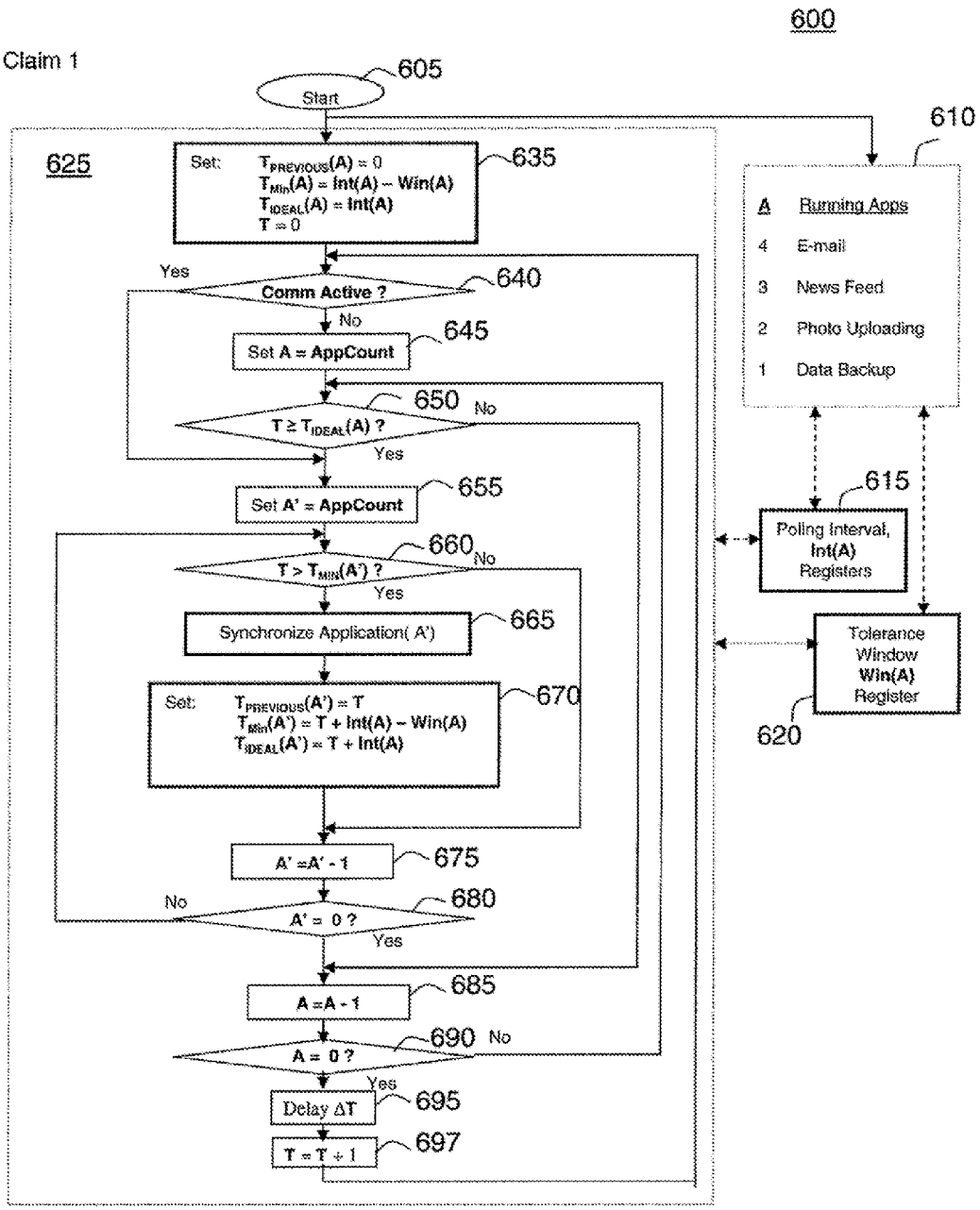
FIG. 6 is a flow diagram of a mobile computing device running an application in synchronous communication with an application server according to one embodiment of the present invention.

Referring to FIG. 6, there is shown a flow diagram 600 of a preferred embodiment in accordance with the instant invention. The process starts at node 605 from which the process branches to the concurrently running applications 610. Depicted in 610 are four running applications: e-mail, news feed, photo upload, and data back-up, having application number, A=4, 3, 2, and 1, respectively. Each application writes a predetermined interval, Int(A) into poling a interval register 615, and a predetermined tolerance window, Win(A) into tolerance window register 620. These predetermined values may be changed by the application according to the state of the application. For example, the email application may reduce the interval during business hours, or the news feeding application may increase its interval when the user is actively reading the news. The starting node also branches to the poling management process (in phantom) 625, beginning with initialization 635 in which for each application the following counters are set:

$T_{PREVIOUS}(A)=0$ $T_{Min}(A)=\text{Int}(A)-\text{Win}(A)$ $T_{IDEAL}(A)=\text{Int}(A)$

T=0.

The process continues to the decision diamond 640 where it is determined if communication is presently active. If at decision diamond 640 communication is not active, or "No", then the process continues to setting the application counter 645 to A equal to the number of running applications, Appcount, which in this example is equal to 4. From there, the process flows to decision diamond 650 where it is determined whether for application A the present time T is equal to $T_{IDEAL}$ (A). If at decision diamond 650 it is determined that $T=T_{IDEAL}(A)$ then it is determined that synchronization should occur and the process continues to setting the second application counter 655 to A' equal to the number of running applications, Appcount. Also, at decision diamond 640, if it is determined that communication is active, or "Yes", then the process continues to setting the second application counter 655 to A'=Appcount. The process continues to decision diamond 660 where it is determined whether $T>T_{Min}(A')$. If it is decided that $T>T_{Min}(A)$, or "yes", then the process continues to synchronizing application A' 665 and then to re-initialization 670 of timers for application A':

$T_{PREVIOUS}(A')=T$ $T_{Min}(A)=T+\text{Int}(A')-\text{Win}(A')$ $T_{IDEAL}(A')=T+\text{Int}(A')$ The process continues to decrementing counter A' 675, followed by decision diamond 680 at which it is determined whether A'=0. If at decision diamond 680 it is determined that A'=0, or "yes" then the process continues to decrementing A'

685, followed decision diamond 690 where it is determined whether A=0. If at 690 it is determined that A=0, or "yes", then the process continues to delay box 695. From box 695, the process continues to incrementing T at box 697, and from there the process continues back to decision diamond 640. If at 640 it is determined that communication is active, or "yes" then the process skips to setting the second application counter at box 655 to A'=the number of running applications, Appcount. If at decision diamond 660 it is determined that T # $T_{min}$(A'), or "no", then the process skips to decrementing A' box 675. If at decision diamond 680 it is determined that A'≠0, or "no" then the process returns to decision diamond 660. If at decision diamond 690 it is determined that A≠0, then the process continues to decision diamond 650. Flow control for alternative embodiments can be demonstrated in a similar manner.

Figure 7:
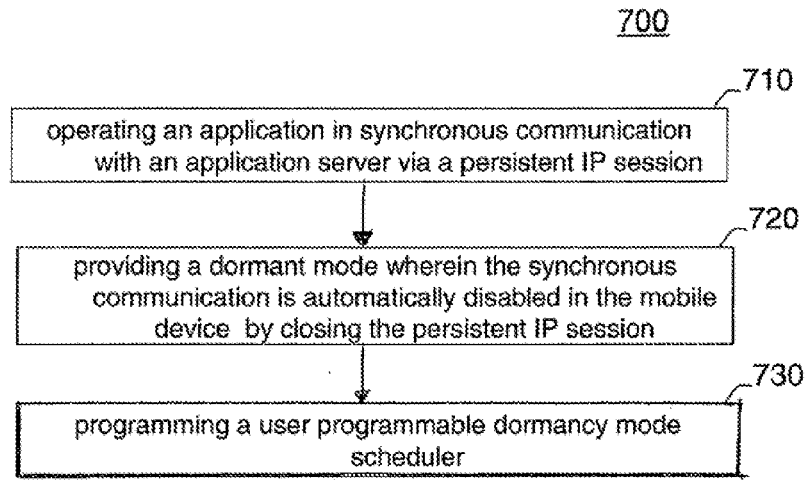
FIG. 7 is a simplified block diagram of a method of saving energy in a mobile device running an application in synchronous communication with an application server, to reduce energy drain, according to an embodiment of the present invention.

Referring to FIG. 7, an embodiment of a method 700 of saving energy in a mobile device running an application in synchronous communication with an application server, is shown. In its simplest form, it includes the steps of: operating 710 an application in synchronous communication with an application server via a persistent internet protocol (IP) session, defining an active mode, wherein the synchronous communication is automatically enabled by establishing a persistent IP session according to a prearranged schedule; and providing 720 a dormant mode wherein the synchronous communication is automatically disabled in the mobile device by closing the persistent IP session according to the prearranged schedule. In an alternative embodiment, the method 700 includes the step of programming 730 a user programmable dormancy mode scheduler for scheduling the dormant mode period. Advantageously, a user can provide off-peak or quiet times (dormant mode) and/or on-peak or active times (active mode) by using a programmable scheduler. Referring again to FIG. 1, the infrastructure 106 typically employs firewall techniques to disallow the establishment of TCP/IP connections to the mobile devices from the internet. This helps to prevent or minimize mobile devices from receiving spurious internet traffic which would cause unwanted power drain. Thus an IP session with the application server cannot usually be established by any application server. It must be established from the mobile device. Mobile devices 102 and 110 may initiate an IP session by communicating with an internet gateway (not shown) in the wireless infrastructure 106. In a preferred embodiment, an IP session, comprising a transfer control protocol internet protocol (TCP/IP) connection, may be started by a mobile device 102 or 110 activating a packet data protocol (PDP) context with the internet gateway in the wireless infrastructure 106. The PDP context defines a unique IP address by which the application server can communicate with the mobile device.

After a TCP/IP session is established, the session remains active for an amount of time determined by a session timer at the application server or the internet gateway in the wireless infrastructure 106. If there is no further communication from the mobile device, the session remains open until the session timer expires, and then the TCP/IP connection is closed. Advantageously this allows the server to stop sending application data if the client is removed from the service, without gracefully closing the TCP/IP connection, as tends to occur in mobile device clients for a number of reasons including weak signal conditions, and sudden loss of battery power. Each communication from the mobile device client to the application server causes the session timer to be reset. The mobile device can maintain a persistent IP session by sending keep-alive messages to the application server at intervals less than the session timeout period. The session time-out period is determined by the server or gateway, and is typically 30 minutes. Thus the application server is able to send, or "push", application data to the mobile device while the IP session is maintained active.

At times when application data is "not needed", the mobile device can prevent data from being "pushed" to it by changing the PDP context. In more detail, the mobile device may close the TCP/IP session by sending a TCP/IP connection header including the connection-token 'close'. The TCP/IP session is thereby closed, depriving the application server of a connection by which it can send application data. Advantageously, energy can be saved in the mobile computing device, thereby extending the life of an energy storage device or a battery. By the use of intelligent pushing management, substantial energy savings can be gained, by using prearranged scheduling of dormant and active modes.

Thus the PDP protocols and persistent TCP/IP or UDP session protocols are adapted for reducing power drain on the mobile device. For a more detailed definition of persistent TCP/IP operations, see the hypertext transfer protocol (HTTP) 1.1 specification document published under RFC2616 specification, by the internet society.

In a preferred embodiment, the operating step 710 includes receiving push notifications from the application server during the persistent IP session. In another arrangement, the operating step 710 can include the persistent IP session being maintained active by periodic keep-alive messages from the mobile device to the application server.

The providing step 720 can include closing the persistent IP session, thereby ending further push notifications. Advantageously, this feature allows the mobile device to schedule dormant or quiet times and active times, independently of the application server. In another embodiment, the providing step 720 can include the persistent IP session being closed by allowing the session to time-out, by refraining to send a keep-alive message from the mobile device to the application server.

In more detail and in a preferred embodiment, the method 700 can include an autonomous pushing management function, in module 290 for example. It can consider when a data communication is "needed" or "not needed", and specifies triggers for entering an active mode, wherein an application program running in communication with the application server, and for entering a quiet or dormant mode in which the synchronous communication is stopped or interrupted.

In a preferred embodiment, a PDP context is needed when operating in an on-peak period. Thus, particular focus is given to the always-on user experience, and the PDP context is maintained, and as long as there is at least one active TCP or UDP session. On the other hand, the PDP context is not needed when operating in an off-peak or dormant period, when application currency can be sacrificed in favor of reduced power drain. In this case, the PDP context is released, unless there is some user activity detected. For example, when the user has an application active (either in foreground or background) that maintains a persistent TCP socket, then the PDP context would be needed.

In more detail, a preferred PDP context management strategy can include the following:

1. When the mobile device is connected to a power supply, the PDP context shall always remain active. A power supply might be a battery charger, or AC power adapter, or a host device such as a personal computer which provides power via a connection, such as a universal serial bus (USB) connection.

2. When the mobile device gets its power from an internal battery during an On-Peak period (active mode): If the PDP context is established, it shall remain established as long as there is at least one TCP or UDP session active.

If the PDP context is established and all TCP and UDP sessions get deactivated, the PDP context shall be released.

If the PDP context is not established and an application makes a request for a new TCP or UDP session, the PDP context shall be established.

If the PDP context is not established, it shall remain not established as long as there is no TCP or UDP session active.

3. When the UE operates on battery and during the Off-Peak period:

When the screen switches off (no user activity), the PDP context shall be released and shall remain released as long as no user activity is detected and the Off-Peak period does not end.

When the screen switches on (user activity detected), the PDP context shall be established and shall remain established until the screen switches off again.

Alternatively the PDP context may be maintained or reestablished in off-peak hours if an active user detection state is detected.

Examples of active user detection are detecting an active user interface such as a display, touch-screen, keypad or backlight; detecting motion of or in proximity to the device, such as motion or acceleration of the device itself, or of an object near to the device; and detecting a wireless connection to the device such as a wireless headset activation.

In a preferred embodiment, the method 700 can further include maintaining other communications between the mobile and other communication entities in the active and in the dormant mode. Advantageously, this feature allows certain communications, such as social network applications, to be turned off, while other application servers to be turned on. For example, the method 700 can further include maintaining other communications between the mobile and other communication entities, while in the dormant mode, the other communications comprising at least one of voice communications, short message service communications, and data communications, employing an IP session different from the persistent IP session with the application server.

Figure 8:
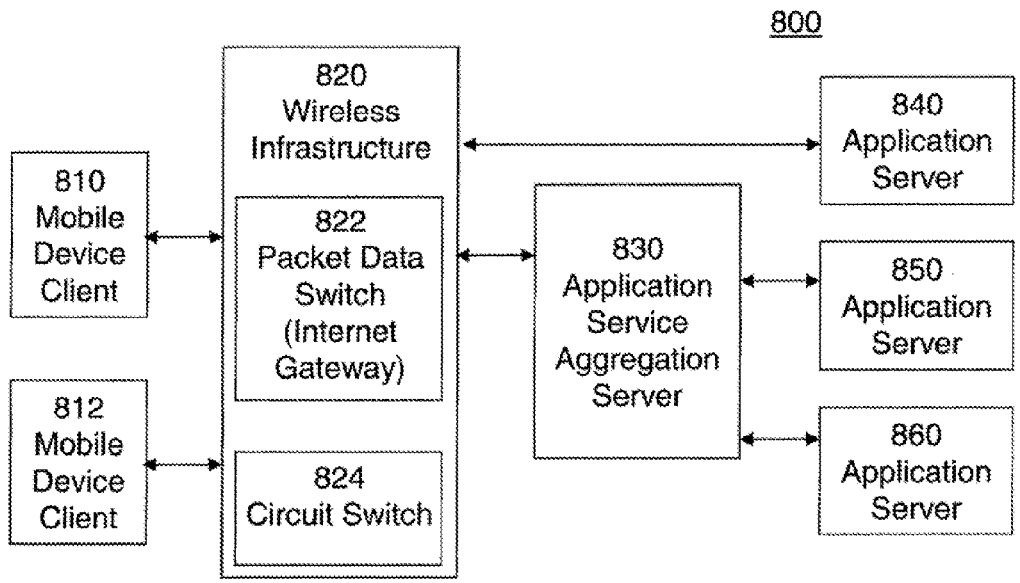
FIG. 8 is a simplified block diagram of a method of saving energy in a mobile device running an application in synchronous communication with an application server, to reduce energy drain, according to an embodiment of the present invention.

Referring to FIG. 8, a system 800 with intelligent pushing management for increasing the battery life of a mobile computing device, is described and shown. The system 800 can include mobile computing devices 810 and 812 that are coupled to a wireless communication infrastructure 820. The wireless infrastructure includes a packet data switching connection 822, such as a subscriber gateway service node (SGSN) found in a general packet radio service (GPRS) infrastructure. The wireless infrastructure 820 can also include a circuit connection 822 for connecting voice applications as well as connecting legacy data applications such as short message services (SMS). The mobile devices 810 and 812 are configurable to connect via the internet gateway 822 in the wireless infrastructure 820, to application service aggregation servers 830, and to stand-alone application server 840 via the internet. The application service aggregation server 830 connects via the internet to stand-alone application servers 850 and 860. The mobile devices 810 and 812 are also configurable to communicate over the wireless infrastructure 820 via a circuit switching infrastructure 824. Circuit switching infrastructure is used for legacy communication services such as voice calling, short message services (SMS) and circuit switched data services. The principles described herein may be applied to a variety of wide area network systems, such as long-term evolution (LTE), ultra mobile wideband (UMB), 802.16e & m, High Rate Packet Data (HRPD) systems, or systems such as the Universal Mobile Telecommunication System (UMTS), as well as wireless local area networks, personal area networks, and wired networks.

The mobile computing devices 810 and 812 may be any type of mobile wireless device. The mobile computing devices 810 and 812 each include an intelligent pushing management module 112 or 290 for coordinating synchronous communications between application server poling applications, as detailed below.

For example, the mobile computing devices 810 and 812 may be cellular telephones, pagers, radios, mobile stations, personal computers, or personal digital assistants. As should be understood by those skilled in the art, other examples of mobile computing devices are possible.

Mobile devices 810 and 812 may connect to the wireless infrastructure 820 via radio access networks (RANs), as shown in FIG. 1. The RANs may be any device or combination of devices that allow the mobile computing devices 810 and 812 to have access to the communication infrastructure 820. For example, the RANs may include access points, base stations, base station controllers, antennas, and other types of devices that facilitate these communications.

The communication infrastructure 820 preferably includes devices and/or networks that allow communications to be made between mobile stations. For example, the infrastructure 106 may include switches, servers, storage devices, and networks (e.g., wireless networks, the Internet, landline telephone networks) that facilitate communications between the mobile computing devices 810 and 812 and internet devices such as application servers 830 and 840.

The application service aggregation server 830 provides the function of periodically polling application servers 850 and 860 for new data, and then providing the application data to the mobile devices 810 and 812 via the packet data switch 822 in the wireless infrastructure 820. For example, application servers 850 and 860 may be conventional social networking applications, such as Facebook, Twitter, etc. The aggregation server 830 may poll for status notifications from social contacts on the Facebook service, and for new messages on the Twitter service. It stores the new data in a memory and makes it available to the mobile device via wireless infrastructure by pushing or pulling methods, as detailed herein.

The mobile devices 810 and 812 are configurable to connect simultaneously to multiple data servers and the methods described herein include maintaining communications between a mobile device and a first application server, while in a dormant or quite mode with a second application server. For example, mobile devices 810 and 812 can connect via the internet gateway 822 in the wireless infrastructure 820, to a service aggregation server 830, and can also connect to a stand-alone application server(s) 840, bypassing the application service aggregation server 830. The stand-alone application server may be an email application such as Gmail, for example.

The methods described herein, can include maintaining communications between the mobile and the stand-alone email application server, while in the dormant mode suspending communications to the aggregation server 830, for example. This can be accomplished by establishing different PDP contexts between the mobile device and the wireless infrastructure for connecting to the different services, and applying the dormancy triggers differently to the different PDP contexts. Connections to the stand-alone application server 840 may, for example, remain active during the quiet or off-peak hours when connections to the aggregation server 830 are closed.

Conversely, for simplicity and convenience to the user, a single dormancy scheduler and policy can be applied to different application services with different PDP contexts. Thus in a dormant mode communication communications to all data servers can be suspended, even if they are different PDP contexts are used. In this way a dormant mode which is most effective for reducing power drain may be conveniently scheduled.

In a preferred embodiment, voice communications and short message service communications are not affected by the closing of PDP contexts, since these can employ the circuit switched infrastructure 824 in the wireless infrastructure 820, not requiring a PDP context.

In a preferred embodiment, an automatic mode controller can be provided, wherein the mobile device is switched to the active mode when user activity is detected. Advantageously, this feature provides a user over-ride function to allow a user to instantly enter the active mode, when desirable.

In more detail and as an example, the detected user activity can include at least one of: detecting motion in proximity to the mobile device; detecting a key press; detecting a touch screen press; detecting that a display is active; and detecting an incoming communication. Advantageously this allows a user to use an application during a prearranged off-peak or quiet time, without having to reprogram the quiet hours.

In another example, the method 700 can include providing an automatic mode controller wherein the device is switched to the active mode when the device is connected to a charging device. A charging device can include at least one of an AC adapter, a battery charger, and a host device. A host device can include a PC, or any device which provides a DC power supply via a data connector such as a USB connector. A battery charger can be a wired or a wireless power supply.

In another example, the method 700 can include providing an automatic mode controller wherein the device is switched to the active mode when a communication is received. The communication may be an incoming communication from the cellular network, a local area network or from a personal area network device such as a wireless headset.

In another example, the method 700 can include providing an automatic mode controller wherein the device is connected to an accessory device. For example, the accessory device could be a wired or wireless charger, a power supply, AC adapter, battery charger, a user interface device such as an external mouse, touch controller, an audio or acoustic device, a data cable, or an external memory device.

In one embodiment, the method 700 can include the operating step 710 including operating an application processor on the mobile device, and suspending operation of the application processor. Similarly, in another arrangement, the operating step 710 can include operating an application service daemon on an application processor on the mobile device, and suspending operation of the application service daemon. Advantageously these provide a power drain reductions due to the disabling, idling or reducing of the applications processor operations.

In another embodiment, the method 700 can include the steps of: operating 710 an application in synchronous communication with an application server via a persistent IP session, defining an active mode; providing 720 a dormant mode wherein the synchronous communication is disabled in the mobile device; and programming 730 a user programmable dormancy mode scheduler for scheduling the dormant mode period. Advantageously, a user can provide quiet times (dormant mode) and/or active times (active mode) by using a programmable scheduler. This allows a mobile device to be operated in a customized fashion, based on a various users' preferences, personalities and schedules.

In a preferred embodiment, as shown in FIG. 5, a mobile computing device 200 is shown. It can include: a housing 210; a controller 220 coupled to the housing 210, the controller 220 configured to run applications in synchronous communication from one or more application servers; memory 270 coupled to the controller 220; a wireless transceiver 250 coupled to the controller 220 for synchronizing application data between the mobile computing device 200 and the one or more application servers; and a push management module 290 configured to: operate an application in synchronous communication with an application server via a persistent IP session, defining an active mode, wherein the synchronous communication is automatically enabled by establishing a persistent IP session according to a prearranged schedule; and provide a dormant mode wherein the synchronous communication is automatically disabled in the mobile device by closing the persistent IP session according to the prearranged schedule. Advantageously, the mobile computing device 200 provides energy savings and longer useful battery life, resulting in an enhanced user experience. Advantageously, energy can be saved in the mobile computing device, thereby extending the life of an energy storage device or a battery. By the use of intelligent pushing management, substantial energy savings can be gained, by using prearranged scheduling of dormant and active modes.

In FIG. 5, block 290 states "Polling Management Module", however in the above embodiment, the module is in the form of a "push management module".

In one embodiment, the push management module 290 includes a user programmable dormancy mode scheduler for scheduling the dormant mode period, which helps to extend battery life as previously detailed.

In one embodiment, the push management module 290 is further configured to maintain other communications between the mobile computing device 200 and other communication entities such as voice services or data services to entities with different PDP contexts, as detailed previously. In this way the user may individually select or set applications to be dormant during off-peak or quiet hours.

In one embodiment, the push management module 290 is configured to switch to the active mode when certain user activity is detected. This override feature allows a user to instantly go into active mode, if desired.

In one embodiment, the push management module 290 can include one or more of the features detailed previously with respect to the method 700, for an enhanced user experience.

Those skilled in the art will recognize that a wide variety of modifications, alterations, and combinations can be made with respect to the above described embodiments without departing from the broad scope of the invention, and that such modifications, alterations, and combinations are to be viewed as being within the scope of the invention.

The invention claimed is:

1. A method of saving energy in a mobile device running an application in synchronous communication with an application server, comprising the steps of:

operating an application in synchronous communication with an application server via a persistent IP session, defining an active mode, wherein the synchronous communication is automatically enabled by refreshing the persistent IP session according to a prearranged schedule; and providing a dormant mode wherein the synchronous communication is automatically disabled in the mobile device by closing the persistent IP session according to the prearranged schedule, wherein the operating step includes receiving push notifications from the application server on the persistent IP session, and the providing step includes closing the persistent IP session and thereby ending further push notifications.

2. The method of claim 1 wherein in the providing step, the persistent IP session is closed by sending a TCP/IP connection header including a connection-token close in accordance with HTTP1.1 standard.

3. The method of claim 1 wherein in the operating step, the persistent IP session is maintained active by periodic keep-alive messages from the mobile to the application server.

4. The method of claim 1 wherein in the providing step, the persistent IP session is closed by refraining to send a keep-alive message from the mobile to the application server.

5. The method of claim 1 further comprising maintaining other communications between the mobile and other communication entities in the active and in the dormant mode.

6. The method of claim 1 further comprising maintaining other communications between the mobile and other communication entities, while in the dormant mode, said communications comprising at least one of voice communications, short message service communications, and data communications, employing an IP session different from the persistent IP session with the application server.

7. The method of claim 1 further comprising providing an automatic mode controller wherein the device is switched to the active mode when user activity is detected.

8. The method of claim 1 further comprising providing an automatic mode controller wherein the device is switched to the active mode when a user activity is detected including at least one of: detecting motion in proximity to the mobile device; detecting a key press; detecting a touch screen press; detecting that a display is active; and detecting an incoming communication.

9. The method of claim 1 further comprising providing an automatic mode controller wherein the device is switched to the active mode when the device is connected to a charging device.

10. The method of claim 9 wherein the charging device is at least one of an AC adaptor, a battery charger, and a host device.

11. The method of claim 1, wherein the operating step includes operating an application processor on the mobile device, and the providing step includes suspending operation of the application processor.

12. The method of claim 1, wherein the operating step includes operating an application service daemon on an application processor on the mobile device, and the providing step includes suspending operation of the application service daemon.

13. A method of saving energy in a mobile device running an application in synchronous communication with an application server, comprising the steps of:
    operating an application in synchronous communication with an application server via a persistent IP session, defining an active mode; and
    providing a dormant mode wherein the synchronous communication is disabled in the mobile device; and
    programming a user programmable dormancy mode scheduler for scheduling the dormant mode period,
    wherein the operating step includes receiving push notifications from the application server on the persistent IP session, and the providing step includes closing the persistent IP session and thereby ending further push notifications.

14. The method of claim 13 wherein in the providing step, the synchronous communication is disabled by the mobile device by at least one of the mobile device closing the persistent IP session, and the mobile device entering a transceiver idle state.

15. The method of claim 13 wherein the operating step includes receiving push notifications from the application server on the persistent IP session, and the providing step includes closing the persistent IP session and thereby ending further push notifications.

16. A mobile computing device, comprising:
    a housing;
    a controller coupled to the housing, the controller configured to run applications in synchronous communication from one or more application servers;
    memory coupled to the controller;
    a wireless transceiver coupled to the controller for synchronizing application data between the mobile computing device and the one or more application servers; and
    push management module configured to: operate an application in synchronous communication with an application server via a persistent IP session, defining an active mode, wherein the synchronous communication is automatically enabled by establishing a persistent IP session according to a prearranged schedule; and provide a dormant mode wherein the synchronous communication is automatically disabled in the mobile device by closing the persistent IP session according to the prearranged schedule, wherein the operating step includes receiving push notifications from the application server on the persistent IP session, and the providing step includes closing the persistent IP session and thereby ending further push notifications.

17. The mobile computing device of claim 16, wherein the push management module includes a user programmable dormancy mode scheduler for scheduling the dormant mode period.

18. The mobile computing device of claim 16, wherein the push management module is further configured to maintain other communications between the mobile and other communication entities.

19. The mobile computing device of claim 16, wherein the push management module is configured to switched to the active mode when certain user activity is detected.

* * * * *